Sept. 25, 1923.  
C. A. LAISE ET AL  
1,469,043
PROCESS FOR MAKING ELECTRICAL CONTACTS
Filed May 2, 1921    3 Sheets-Sheet 1
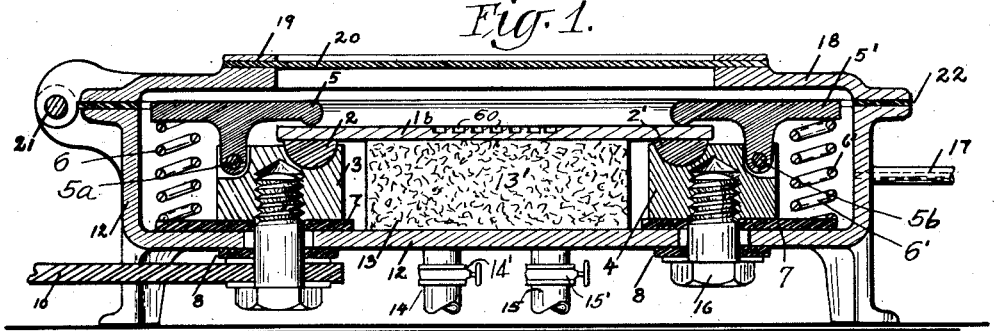
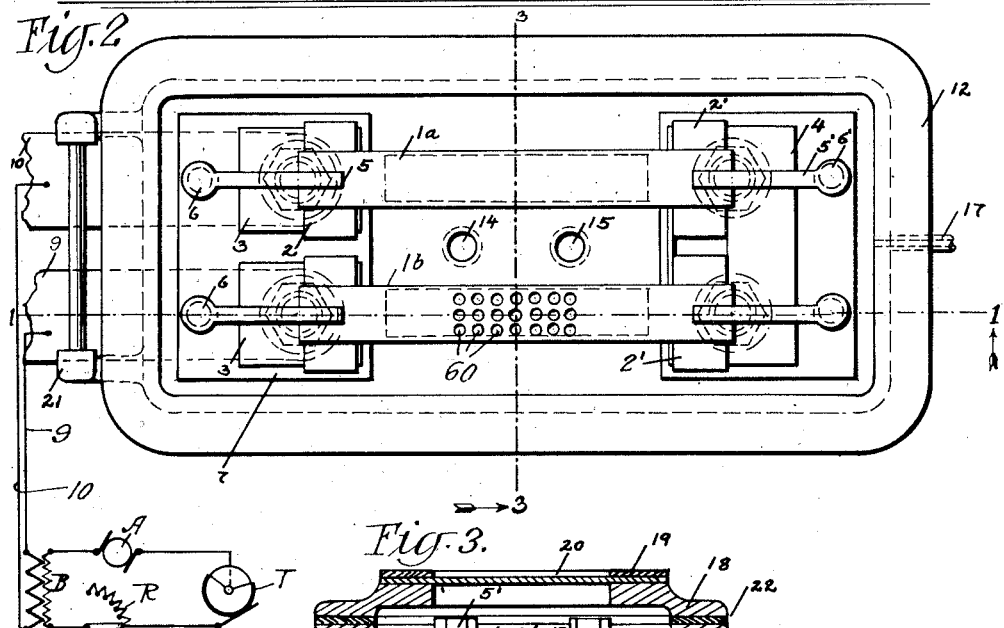
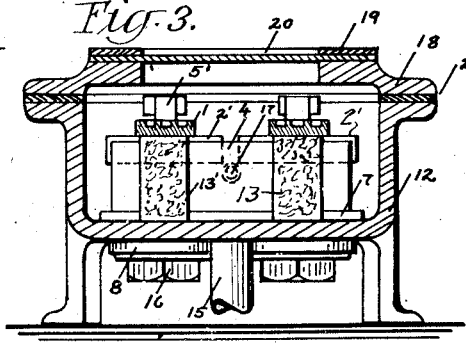
Clemens A. Laise  
Orville C. Hollopeter  
INVENTORS
BY
ATTORNEY.

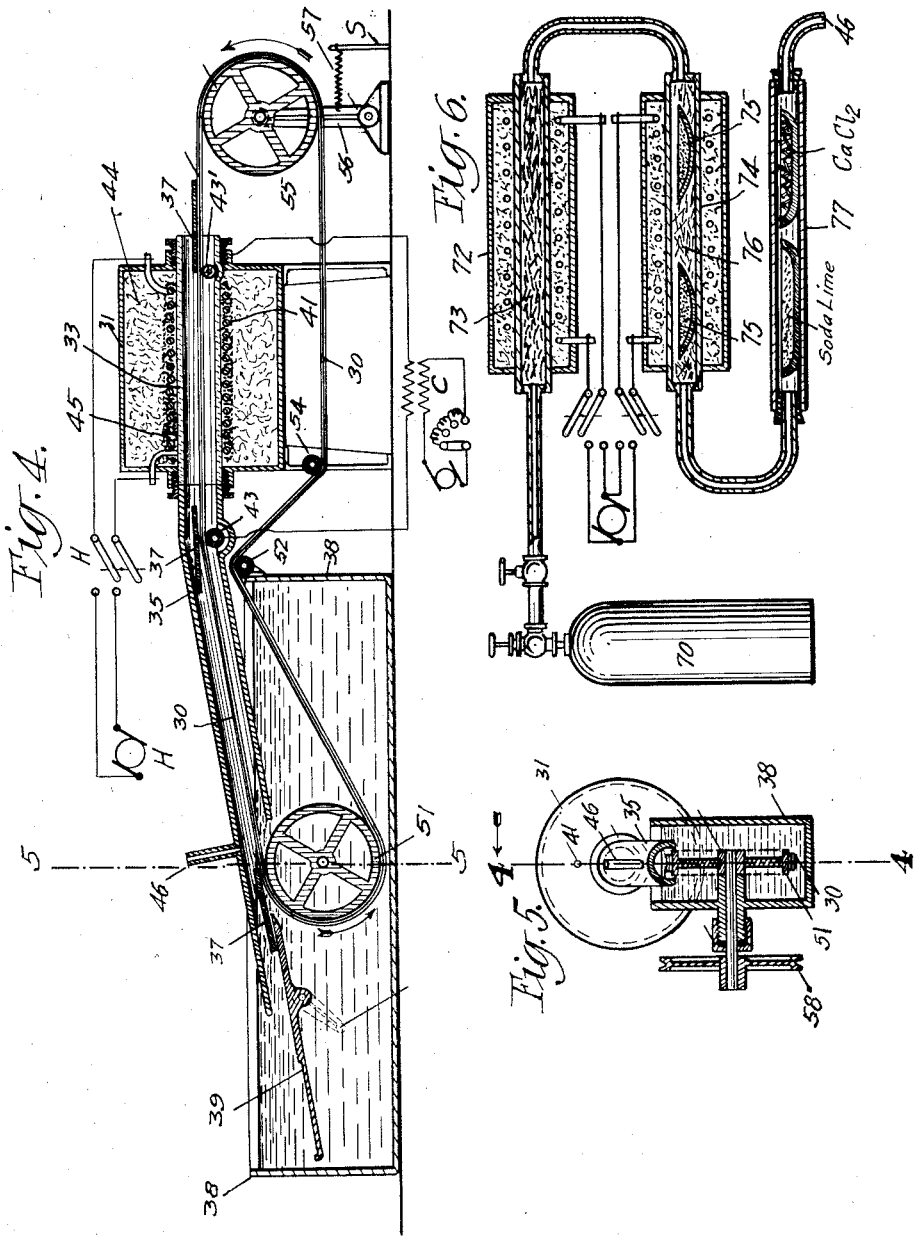

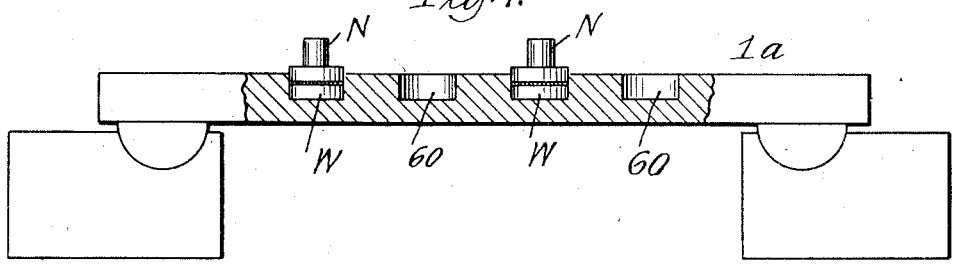
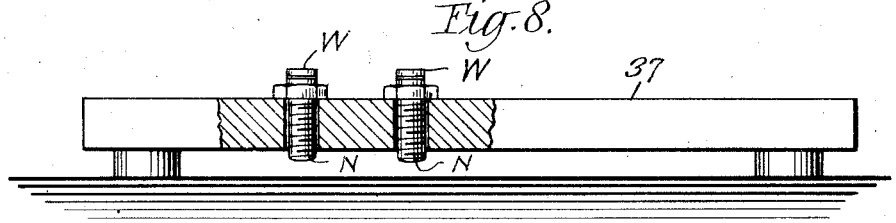
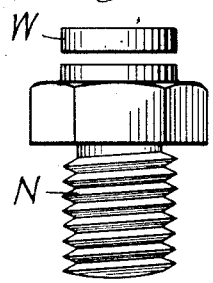
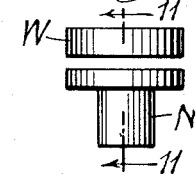
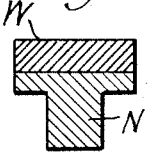
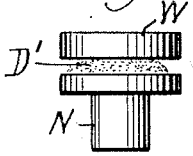
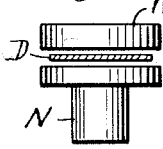
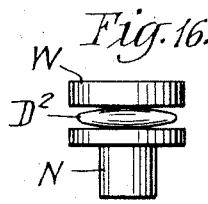
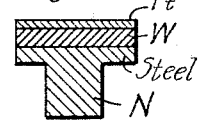
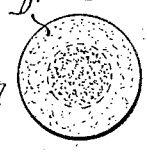
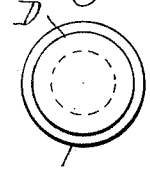
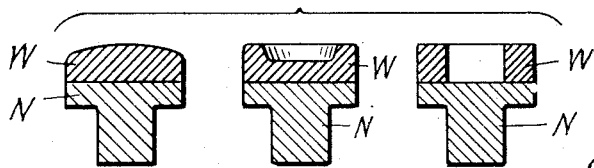

Patented Sept. 25, 1923.

1,469,043

UNITED STATES PATENT OFFICE.

CLEMENS A. LAISE, OF WEEHAWKEN, NEW JERSEY, AND ORVILLE C. HOLLOPETER, OF NEW YORK, N. Y., ASSIGNORS TO INDEPENDENT CONTACT MANUFACTURING CO., A CORPORATION OF NEW JERSEY.

PROCESS FOR MAKING ELECTRICAL CONTACTS.

Application filed May 2, 1921. Serial No. 466,025.

*To all whom it may concern:*

Be it known that we, CLEMENS A. LAISE and ORVILLE C. HOLLOPETER, citizens of the United States, and residents, respectively, of Weehawken, Hudson County, State of New Jersey, and borough of Manhattan, city and State of New York, have jointly invented certain new and useful Improvements in Processes for Making Electrical Contacts, of which the following is a specification.

Owing to the rapid growth of the automobile industry as well as the great improvements in the art of telegraphy and telephony and improvements in the control of railway systems the demand for a more satisfactory ignition and contact point has steadily increased.

The contact surfaces of electrical contacts usually consists of metallic bodies having discs or face plates of precious metals or alloys, such as gold, platinum and iridium, or of the refractory metals or alloys, such as tungsten, molybdenum, tantalum, etc. In many cases the electrical contact consists entirely of the above specified metals or alloys of the same, although owing to their high cost, in most cases a thin disc of these metals is provided for the face plates which disc is joined to a base metal which is far less costly, which base metal is in turn riveted to the part of the device or installation on which it is to operate.

The process of contact manufacture, therefore, resolves itself essentially into the joining, brazing or welding of the face plates of thin contact pieces or discs, either of precious or refractory metals or their alloys of high melting points to the base metal rivets or screws of lower melting points.

Commercial welding or brazing or soldering operations for joining large pieces of metal or alloys are well known in the art. Our invention, however, relates to a process for joining smaller metallic bodies to each other on a very large scale and producing a mechanically strong joint as well as a joint of high electrical and heat conductivity. It is also essential that this joining of the two metals should be accomplished by means of a process which will result in impairing neither the quality of the face plate nor the quality of the base metal backing, but rather subjecting the component metals to such a treatment that they emerge from the welding or brazing operations in a condition particularly suited for contact purposes, thus producing contacts or ignition points of superior quality. This is accomplished by a treatment which will make the base metal or steel backing softer, thus producing a superior riveting joint, also imparting to the face plates of precious or refractory metal a more tenacious or superior structure so that they will be especially suited for contact purposes.

By so treating the metals, a contact can be produced in which the joined disc or face plate cannot be severed so easily from the supporting rivet, which occurs quite frequently during the riveting operation of the present processes, nor will the disc become loose in service, as is now frequently the case.

Our process requires the use of materials and procedures or steps novel to the art which not only enable us to produce much superior contacts which are more uniform in quality, but also results in a substantial reduction in manufacturing cost.

As above stated, there are several well known methods for joining metals such as welding, soldering, brazing and riveting or mechanical joining. Since our problem relates to the joining of a disc or face plate of one metal to a blank or rivet of another metal and relates essentially to the joining of small discs of one kind of metal suitable for a contact face plate to another kind of metal suitable for a support and for subsequent riveting, the method of joining adopted by us falls under the classification usually known as brazing.

The ordinary methods of brazing consists in joining pieces of metal by fusing them with an intermediate material, such as an alloy or metal or lower melting point than the material to be joined, usually a flux. The intermediate material must wet or alloy with both metals to be joined in order to produce a good juncture, especially for contact purposes.

The operations or steps involved in the process of brazing are:

First: cleansing to a high degree the surfaces to be joined.

Second: applying a flux to prevent the surfaces from oxidizing.

Third: rigidly holding by clamps or otherwise the materials to be welded.

Fourth: placing a suitable supply of the proper spelter or joining material between the parts to be welded, unless the parts are welded directly, in which case the alloy of the two metals being joined will act as a spelter.

Fifth: applying heat in a suitable way to bring about the union of the two metals, the heat being generally accompanied by pressure.

The present methods of contact manufacture which involve the joining of tungsten discs to steel or nickel supporting blanks, or the joining of discs of the platinum metals to steel or nickel supporting blanks, usually employ the five general steps outlined above, which steps are well known in the art. Notwithstanding this fact, these methods while well known are still very crude and a non-uniform product is the usual result. Thus, in the present methods of welding each individual contact or the units of the contacts are subjected to heat for varying lengths of time which is productive of non-uniformity. The contacts are frequently held in holders of graphite or refractory material which have a tendency to cement or harden the steel rivet and a spelter or joining material is used which does not properly wet the metals to be welded, nor does it form a soft intermediate cushion of a conductive alloy between the metals. It is frequently necessary in the processes known to the art to use an explosive gas such as hydrogen, the use of which endangers the operators.

In the carrying out of our invention we have eliminated these factors and have introduced methods and processes new to the art. Thus, the joining, welding or brazing operation is timed so that each particular type of contact during this step passes through the heat cycle in a given time just sufficient to satisfactorily join the constituent parts.

We have found that in the joining of steel or nickel to platinum, platinum alloys, tungsten and tungsten alloys, the heat transmitting medium for holding the parts should consist of the electrical resistance alloy known in the trade as "Rayo" or "Karma" (reference to which is to be found in the 1921 catalogue of the Electrical Alloy Company of Morristown, New Jersey), each being a substantially pure alloy of nickel and chromium which is far superior for this purpose than the holders or boats heretofore used. For the above specified purpose we use a rolled flat slab or chain of rolled nickel-chromium alloy such as "Rayo" or "Karma" which we find is superior to the cast nichrome.

In using the ribbon or slab of this nickel-chromium alloy we first oxidize it so as to cover its surface with a thin film of chromium oxide in order to prevent the alloying of the spelter material with the holder and in order to prevent the metals of the contacts from sticking to the holder. Since this rolled nickel-chromium alloy has a melting point of about 3000 degrees F., and since it forms a refractory oxide on its surface which is neither volatile nor reduced in hydrogen, nor alloys with the spelter which we use, and since it has a high resistance, its use is exceedingly advantageous in the carrying out of our process of contact manufacture.

As a joining material or spelter, copper and copper zinc alloys, silver and silver alloys, etc., are well known in the art. We have found, however, that in order to wet or alloy the refractory metals of high melting points, such as platinum or tungsten, a spelter containing the respective elements which are to be joined to the base gives the best results. Thus, if we wish to weld tungsten to the base metal the best results are obtained by using a tungsten alloy or a paste containing tungsten, and if we wish to weld platinum to the base metal, the best results are obtained by using a platinum alloy or a paste containing platinum. Thus, in welding a tungsten disc or face plate to the supporting base metal, we prefer to use as a spelter either a disc of a tungsten-copper alloy or a copper paste containing very finely divided copper and colloidal ammonium tungstate as the binding material.

In welding platinum discs to base metal supports we prefer to use a disc of platinum copper alloy or a copper paste containing very finely divided copper and ammonium chlorplatinate as a binding material.

In the welding processes of the prior art, a flux such as borax or ammonium chloride is usually used to prevent oxidation of the metals to be joined. We use instead ammonia and thus carry on the operation practically in an inert atmosphere, the ammonia even dissociating into a non-explosive mixture of nitrogen and hydrogen.

Also in the welding or joining operations of the art, heat is applied by means of a torch or by an electric spot welding operation, or in gas or by means of gas, oil or electric furnaces. As contradistinguished from this we employ as a holder a boat or ribbon of mechanically worked nickel-chromium resistance material which generates the heat itself by the passage of an electric current through the same, and thus we have found that the contacts are welded in a most efficient and satisfactory manner. For joining larger pieces in some cases we may dispense with the heating of the holder by means of the electric current and may prefer to draw the nickel chromium alloy holder through an electric furnace, by which operation the same principle is employed and a similar result obtained.

In carrying out our process it is desirable to use an apparatus especially adapted for that purpose. The apparatus so used is illustrated in the drawings forming part of this specification, in which:

Fig. 1 is a longitudinal section on line 1—1 of Fig. 2 of an apparatus suitable for use in carrying out our invention when small electrical contacts or rivets are desired.

Fig. 2 is a plan of the device shown in Fig. 1.

Fig. 3 is a section on line 3—3 of Fig. 2.

Fig. 4 is a longitudinal section of an apparatus suitable in the carrying out of our invention when larger contacts are to be manufactured.

Fig. 5 is a section on line 5—5 of Fig. 4.

Fig. 6 is a longitudinal section of a gas drying device utilized in the carrying out of our invention.

Fig. 7 is a sectional view, partly broken away, of our improved nickel-chromium holding plate for use in the manufacture of one form of contact.

Fig. 8 is a similar view for use in the manufacture of another form of contact.

Fig. 9 is an elevation of one form of contact, the face plate and base being removed from each other.

Fig. 10 is a similar view of another form of contact.

Fig. 11 is a section on line 11—11 of Fig. 10, the two pieces of metal being joined.

Fig. 12 is an elevation showing the two parts forming the contact with one form of spelter therebetween.

Fig. 13 is a plan view of Fig. 12 with the contact face plate removed.

Fig. 14 is a view similar to Fig. 12 showing another form of spelter between the two metals to be joined.

Fig. 15 is a plan view of the device shown in Fig. 14 with the metal face plate removed.

Fig. 16 is a view in elevation of a contact in the course of manufacture in which the spelter has changed form during the heat treatment.

Fig. 17 is a vertical section of a contact of a modified form, but manufactured in accordance with our process, in which the face plate is of platinum the base of steel or nickel with an intermediate plate of refractory metal such as tungsten.

Fig. 18 shows a group of contacts each in section and each of different forms or shape.

Referring to the drawings in which the same reference character indicates the same part in the several views, particularly to Figs. 1, 2 and 3, being the apparatus used for the manufacture of small type contacts, we provide a structure consisting essentially of an oblong casing 12 having a cover 18 hinged thereto at 21. In this casing the welding or joining boats or holders 1$^a$ and 1$^b$ of rolled nickel-chromium alloy, are so placed as to rest at each end on copper electrodes 2 and 2′ which are semi-cylindrical in shape. As shown, the said electrodes 2 rest in seats, provided for the purpose in separated electrodes 3, also of copper, and the electrodes 2′ rest in a seat provided in a single copper electrode 4. Copper clamps 5 are pivoted at 5$^a$ to each of the copper electrodes 3 and are held pressed against the ends of the nickel-chromium slab by means of the springs 6 in order to make a good electrical connection. The copper electrodes 3 are connected to the outside circuit as illustrated in Fig. 2, by means of the leads 9 and 10, which leads are insulated from the casing by means of the insulating slabs 7 and 8. The other end of the nickel-chromium boats rest on the single copper electrode 4 and are again clamped to the electrodes 2′ and 4, by means of the clamps 5 through the pressure of the spring 6′, the said clamp 5 being pivoted to the electrode at 5$^b$.

The nickel-chromium boats 1$^a$ and 1$^b$ rest respectively on blocks of refractory material 13 and 13′ consisting of manganese or alundum or any other suitable nonconducting refractory substance. 14 is an inlet pipe for water having a valve 14′, the outlet pipe being shown at 15, which is also provided with a valve 15′. 17 illustrates a gas inlet pipe, the water outlet pipe 15 also being utilized as a gas outlet.

The cover 18 is provided with a window closed by a suitable transparency 20 such as mica, glass or both fitting into the frame 19. A rubber gasket 22 is provided between the cover 18 and the casing 12 so as to produce a tight joint, the cover 18 being quite heavy, its weight being sufficient to press against the gasket and produce a sufficiently tight joint. Power is supplied by the generator A which is connected in the primary side to a suitable electric current transformer B. A regulating device R of an induction regulator or water rheostat, and an automatic timing device T are also provided in the primary circuit. The secondary side of the transformer is connected to the leads 9 and 10.

The current passing through the lead 10 then passes through the copper blocks or electrodes 3 and 2, thence through the welding nickel-chromium slab 1$^a$, then through the copper electrodes 4′ and 2′ through the welding boat 1ᵇ and then through the copper blocks 2, 3 and lead 9, thus completing the circuit.

It is to be understood that although in this apparatus only two boats are shown connected in series, we may if desired, connect more boats in series.

In Figs. 4 and 5 is illustrated an apparatus for the manufacture of larger type contacts and this apparatus consists essentially of a continuous traveling belt, chain or ribbon 30 of substantially pure nickel-chromium resistance material as heretofore described, which belt, chain or ribbon passes through a tube or muffle 33 of nickel chromium alloy or a refractory material such as alundum or silica which in this case is electrically heated by means of nickel-chromium resistance wire or ribbon.

We have found it desirable to provide stationary guides 43 and 43' at either end of the tube 33 upon which guides the belt 30 rests, and which are connected to a transformer circuit C so that the nickel-chromium resistance belt may also be heated by the passage of the current through the same between the guides 43 and 43'. When low temperatures of welding are required this latter means of heating may be used alone, whereas when high temperature is required for welding we may combine the external and internal heating means, or when intermediate temperatures are required the external heating means may be utilized alone.

To provide the aforesaid external heating means, the tube or muffle 33 is wound with a resistance coil 41 connected to an electric circuit as at H and the coil is enclosed in a metal casing 31, which casing is packed with a refractory material such as magnesia or alundum at 44, and the coil is embedded in alundum cement as at 45. The belt 30 passes from the tube 33 through a metal tube or pipe 35 extending into a tank of water or oil 38 and the nickel-chromium boats 37 containing the contacts are received upon the adjustable platform 39. The nickel-chromium belt for carrying the slabs or boats 37 is driven by means of a belt or chain (not shown) mounted on the pulley 58 which drives the wheel 51 over which the belt 30 passes, which in turn passes over and around the small idlers 52 and 54 and over the larger pulley 55 which is preferably adjusted as to tension by means of a pivoted arm 56 and spring 57, one end of which is attached to the pivoted arm 56 and the other to a support S.

The metal portions of the contacts to be welded, joined or brazed together are mounted in seats 60 (see Fig. 7) provided for that purpose either directly on the belt 30, or by placing them into nickel-chromium boats or slabs 37 which in turn are placed on the belt 30.

The speed of the drive pulley 58 is so adjusted that for any particular type of contact a rate of travel of the contact through the heating zone is obtained which produces the best results.

The temperature of the furnace is controlled by means of a pyrometer placed in the bottom of the furnace. An inlet 46 is provided in the pipe 35 by means of which an inert or reducing gas may enter, which gas is preferably dissociated ammonia.

In Fig. 6 we have shown a cylinder 70 filled with ammonia, which gas passes first through an electrically heated tube 72 containing very finely divided pieces of tungsten 73 and from thence it passes through the electrically heated tube 74 containing boats of tungsten powder 75 and other pieces of tungsten 76, and finally through the drying tube 77 containing drying agents such as calcium chloride and soda lime.

In order to make the welded contacts better fitted for the riveting, especially to soften the steel or nickel shanks, the contacts after cooling off to a dull heat are quenched in water or oil by flooding the furnace by means of the pipes 14 and 15, thereby not only softening the steel but imparting characteristics to the face plate which are highly desirable for contact purposes, and at the same time blueing the steel of the contacts. This is especially desirable for rivets, whereas for screws it may sometimes be omitted. Furthermore, as tungsten discs sometimes possess minute flaws or cracks which can not be seen with the naked eye, these when quenched in water or oil while still hot open up and become more apparent and the defective discs can thus be eliminated by inspection.

To recapitulate, our process of contact manufacture may be briefly described as follows:

Tungsten or platinum discs W which have been cut from a rod or punched out of sheet metal are subjected to red heat in an atmosphere of hydrogen. Any impurities or oxides are thereby burned off and reduced. The discs are then cooled in hydrogen gas and may then be tumbled in sawdust for further cleaning and polishing.

Steel or nickel blanks N consisting of screws or rivets, as shown, are washed in carbon tetrachloride, tumbled in the usual way and thus cleaned. For a spelter, we prefer to use an alloy of tungsten-copper, if tungsten metals are to be welded, and an alloy of platinum-copper if platinum metals are to be welded. Usually an alloy of five to ten per cent platinum is used, although higher percentages may be used if the metals to be welded together possess higher melting points than the nickel or steel. These alloys are rolled into thin sheets and discs of from .002″ to .10″ thick. The discs D are then punched out of a size slightly smaller in diameter than the discs of the face plate to be welded or brazed.

Instead of using a copper-alloy spelter we may prepare a paste D' from 250 mesh copper powder to which a ten to twenty per cent solution of colloidal ammonium tungstate is added, if tungsten is to be welded, or a ten to twenty per cent solution of colloidal ammonium chlorplatinate is added, if platinum is to be welded, the paste being of such a consistency that it can be readily placed upon the disc by means of a small glass rod.

The tungsten or platinum discs W are now placed into circular seats 60 drilled in the slab of rolled or worked "Rayo" or "Karma," or some other substantially pure nickel-chromium alloy, containing about the same percentage of chromium as the above named alloys and having a resistance of about 550 to 650 ohms per mil foot and a melting point above 2800 degrees F. and a temperature co-efficient of .00019 or less.

Upon the discs W are placed circular discs D of slightly smaller diameter than the discs W and of a thickness of .002" to .010". Instead of the disc D in some cases we prefer to use the paste D' especially where special discs have to be punched out. Upon these supports either D or D' the blanks N, either rivets or screws of steel or nickel are placed. The contact holders or boats are then placed in the welding furnace and clamped upon the electrodes by means of the copper clamps. The lid of the holder is closed tightly upon the rubber gasket and after the boats are filled and placed the ammonia gas is passed through the apparatus shown in Fig. 6, by means of which it is purified and partially dissociated into a non-explosive mixture of nitrogen and hydrogen and then dried. The gas then enters the welding chamber at the rate of 8 to 15 cubic feet per hour. After the gas displaces the air in the welding chamber the current is turned on and the current in passing through the nickel-chromium alloy resistance material heats the same in about five minutes, to a temperature of approximately 1100 degrees C. The current is regulated by means of a transformer and water rheostat or induction regulator which are conventionally shown in the drawings and its passage timed by the device T. For a "Rayo" slab or boat such as we usually use, which is substantially ¼" wide and $\frac{3}{16}$" to ⅛" thick, a current of about 500 to 600 amperes is necessary to obtain the temperature of approximately 1100 degrees C., though of course the current required depends upon the size of the slabs used.

We have found it very desirable to place in the glass cover directly above the welding boat a colored disc having a degree of redness equivalent to the heat color of 1100 degrees C. and when the two match the proper temperature has been reached.

Generally the spelter begins to melt and the discs or face plates can be seen to centralize themselves, which operation and result are shown conventionally at $D^2$ in Fig. 16, so that the discs or paste D and D' assume the shape $D^2$ and finally the copper will come to a boil. The surface tension then being reduced the spelter globule breaks and the two metals W and N are welded as indicated in Fig. 11.

The automatic timing device T is attached and is set for each particular size boat and type of contact so that the length of time of welding in each case is regulated and is the same.

After the circuit is broken the boats cool and when they reach a dark red temperature the water is raised in the welding chamber and is allowed to come above the top of the contacts, thus quenching the same which results in cooling the boats and causing the contacts to be softened or blued.

The water is then allowed to run out of the welding chamber, the contacts are removed and tumbled in an ammoniacal or alkaline solution or a ten per cent cyanide solution so that any copper which may adhere to the points is thus removed and the contacts are then finished by tumbling in sawdust.

When larger contacts are to be manufactured, we use the continuous or chain drive welding furnace as illustrated in Fig. 4. In using this furnace with its outside heating device the furnace has a heating zone of about 30 to 36 inches and is preferably operated by a 220 volt circuit. The temperature of 1100 degrees C. is maintained when platinum or tungsten contacts are made and the boats are placed in the traveling nickel-chromium alloy belt, the speed of the belt being such that the boat travels the thirty inches in five to six minutes. In this case the ammonia gas, treated as above specified, is permitted to enter at 46 and flows at the rate of about 8 to 15 cubic feet per hour, which is deemed sufficient to prevent any deleterious diffusion of air at the open end of the tube 33. The distance from the heated zone to the water is so regulated that the rate of travel of the boat is such that it reaches the water at a dark red heat, is then quenched, which operation thus softens the backing, and blues the contacts. These contacts are then tumbled in an alkaline solution or a hot ten per cent cyanide solution to remove the volatilized copper, are tumbled in sawdust and are then ready for inspection.

Although we prefer to use the worked or rolled nickel chromium slab, ribbon or chain as the contact holder, electrical resister and heat generator, we have found that either nichrome, molybdenum or tungsten slabs are suitable for this purpose, especially when working in an atmosphere of pure hydrogen, but we find that the price of the latter at the present time is almost prohibitive, and that these elements also have a greater tendency to alloy with the spelter unless they are covered with a thin layer of chromium oxide.

The face plates of the contacts may be of various shapes, such as flat disc, convex, concave or annular rings, such as shown in grouped Fig. 17.

Although we have referred to tungsten and platinum discs, we wish it understood that the same principle of manufacture holds for welding tungsten alloys to steel or nickel blanks, and to the welding of platinum alloy points such as platinum, iridium, etc., to steel or nickel blanks.

Having thus described our invention what we claim as new and desire to secure by Letters Patent is:

1. The herein described process which comprises providing a backing of a base metal and a face plate of refractory metal, introducing joining material containing refractory metal between said backing and plate, and heating said backing and plate to a welding temperature through a combined holder and heating unit composed of dense nickel-chromium alloy in a non-explosive inert atmosphere.

2. The herein described process which comprises providing a backing of steel and a face plate of refractory metal, introducing joining material containing refractory metal between said backing and plate, and heating said backing and plate to a welding temperature through a combined holder and electrical resistance heating unit composed of worked nickel-chromium alloy in a non-explosive reducing atmosphere.

3. The herein described process which comprises providing a backing of a base metal and a face plate of tungsten, introducing joining material containing tungsten between said backing and plate and heating said backing and plate to a welding temperature through a combined holder and electrical resistance heating unit composed of nickel-chromium alloy in a non-explosive reducing atmosphere.

4. The herein described process which comprises providing a backing of steel and a face plate of tungsten, introducing joining material containing tungsten and copper between said backing and plate and heating said backing and plate to a welding temperature through a combined holder and heating unit composed of worked nickel-chromium alloy in a non-explosive inert atmosphere.

5. The herein described process which comprises providing a backing of a base metal and a face plate of refractory metal, introducing joining material containing refractory metal between said backing and plate, and heating said backing and plate to a welding temperature by heating a dense nickel chromium alloy holder having a melting point above 2800 degrees F. in a non-explosive reducing atmosphere, upon which holder said backing and plate is placed.

6. The herein described process which comprises providing a backing of a base metal and a face plate of refractory metal, introducing joining material containing refractory metal between said backing and plate, and heating said backing and plate to a welding temperature in the presence of an inert non-explosive gas upon a nickel chromium holder having a melting point above 2800 degrees F. by heating said holder to effect said welding temperature.

7. The herein described process which comprises providing a backing of a base metal and a face plate of refractory metal, introducing joining material containing refractory metal between said backing and plate, and heating said backing and plate to a welding temperature in the presence of dissociated ammonia upon a holder having a melting point above 2800 degrees F. by bringing the said holder to a welding heat.

8. The herein described process which comprises providing a backing of a base metal and a face plate of refractory metal, introducing joining material containing refractory metal between said backing and plate and heating said backing and plate to a temperature of about 1100 degrees C., through a holder composed of nickel-chromium alloy in a nonexplosive inert atmosphere, said holder functioning as an electrical resistance heating unit.

9. The herein described process which comprises providing a backing of a base metal and a face plate of refractory metal, introducing joining material containing refractory metal between said backing and plate, and heating said backing and plate to a welding temperature in a non-explosive reducing atmosphere through a heating and holding element consisting of a dense nickel chromium alloy holder having a melting point above 2800 degrees F., permitting the welded materials to cool to a dark red temperature and quenching them in a cooling liquid.

10. The herein described process which comprises providing a backing of steel and a face plate of tungsten, introducing joining material containing tungsten between said backing and plate and heating said backing and plate to a welding temperature in a non-explosive inert atmosphere through a heating and holding element composed of a dense nickel-chromium alloy, permitting the welded materials to cool to a dark red temperature and quenching them in a cooling liquid.

11. The herein described process which comprises providing a backing of steel and a face plate of tungsten, introducing joining material containing tungsten between said backing and plate and heating said backing and plate to a temperature of about 1100 degrees C. in a non-explosive inert atmosphere through a heating and holding element composed of a dense nickel-chromium alloy, permitting the welded materials to cool to a dark red temperature and quenching them in a cooling liquid.

12. The step in the manufacture of contacts having a face plate of a refractory metal which consists in subjecting the contact elements to the action of a welding heat through a heated holding element of nickel-chromium.

13. The step in the manufacture of contacts having a face plate of a refractory metal which consists in subjecting the contact elements to the action of a welding heat through a heated holding element of worked nickel-chromium alloy.

14. The step in the manufacture of contacts having a face plate of tungsten which consists in subjecting the contact elements to the action of a welding heat through a heated holding element of worked nickel-chromium alloy in a non-explosive inert atmosphere.

15. The step in the manufacture of contacts having face plates of a refractory metal which consists in subjecting the contact elements to the action of a welding heat through an electrical resistance heating and holding element of worked nickel-chromium alloy coated with a film of chromium oxide in a non-explosive inert atmosphere.

16. The step in the manufacture of contacts having face plates of tungsten which consist in subjecting the contact elements to the action of a welding heat through an electrical resistance heating and holding unit of worked nickel-chromium alloy covered with a film of chromium oxide.

17. The herein described process which comprises providing a backing of a base metal, a face plate of refractory metal, introducing therebetween a joining spelter of a copper alloy of the refractory metal to be joined, and heating such backing and plate in a non-explosive inert atmosphere to a fusing temperature through a substantially pure worked nickel-chromium alloy heater and holder coated with a thin film of chromium-oxide.

18. The herein described process which comprises providing a backing of a base metal, a face plate of refractory metal, introducing therebetween a joining spelter of a copper alloy of the refractory metal to be joined, and heating such backing plate to a fusing temperature through a substantially pure worked nickel-chromium alloy heating and holding unit coated with a film of oxide.

19. The herein described process which comprises providing a backing of a base metal, a face plate of refractory metal, introducing therebetween a joining spelter of a copper alloy of the refractory metal to be joined, and heating such backing and plate in a non-explosive inert atmosphere to a fusing temperature through a substantially pure worked nickel-chromium alloy heating and holding unit coated with a film of oxide, the joining operation being automatically timed.

20. The herein described process which comprises providing a backing of a base metal, a face plate of refractory metal, introducing therebetween a joining spelter of a copper alloy of the refractory metal to be joined, and heating such backing and plate in a non-explosive inert atmosphere to a fusing temperature through a substantially pure worked nickel-chromium alloy heating and holding unit coated with a film of oxide, then quenching the contacts at a dull red heat.

21. The herein described process which comprises providing a backing of a base metal and a face plate of a refractory metal, introducing a joining spelter of a copper-alloy of the refractory metal to be joined between said backing and plate, and heating such backing and plate in a non-explosive inert atmosphere to a welding temperature in the presence of dissociated ammonia through a substantially pure worked nickel-chromium alloy heating and holding unit coated in the oxide, the welding operation being automatically timed, the contacts being quenched in water at a dull red heat.

In witness whereof we have hereunto set our hands at the borough of Manhattan, city, county and State of New York, this 29 day of April, 1921.

CLEMENS A. LAISE.
ORVILLE C. HOLLOPETER.